United States Patent [19]

Bardsley

[11] 4,317,724
[45] Mar. 2, 1982

[54] FEEDING DEVICE FOR USE IN FILTER PRESSES

[75] Inventor: Donald E. Bardsley, Nashua, N.H.

[73] Assignee: Ingersoll-Rand Company, Woodcliff Lake, N.J.

[21] Appl. No.: 152,749

[22] Filed: May 23, 1980

[51] Int. Cl.³ .............................................. B01D 25/32
[52] U.S. Cl. ................................................ 210/225
[58] Field of Search ......................... 210/224, 225, 227

[56] References Cited

U.S. PATENT DOCUMENTS

| | | | |
|---|---|---|---|
| 2,932,399 | 4/1960 | Emele | 210/225 |
| 3,289,844 | 12/1966 | Emele | 210/225 |
| 3,366,244 | 1/1968 | Kurlta | 210/225 |
| 3,390,772 | 7/1968 | Juhasz | 210/225 |
| 3,503,326 | 3/1970 | Juhasz et al. | 210/225 |
| 3,613,563 | 10/1971 | Meshangisser et al. | 210/225 |
| 3,647,082 | 3/1972 | Ishigaki | 210/225 |
| 3,690,462 | 9/1972 | Kurita | 210/225 |
| 3,767,052 | 10/1973 | Shibasaki | 210/225 |

Primary Examiner—Theodore A. Granger
Attorney, Agent, or Firm—Frank S. Troidl

[57] ABSTRACT

The feeding device includes elastically deformable material which is deformed when compressed. Upon release of the compression, the material returns to its original shape thereby releasing potential energy to dislodge any cake tending to stick to the bottom of the device.

5 Claims, 11 Drawing Figures

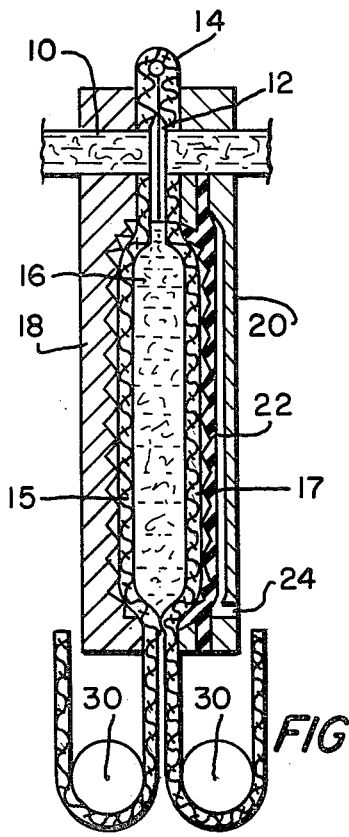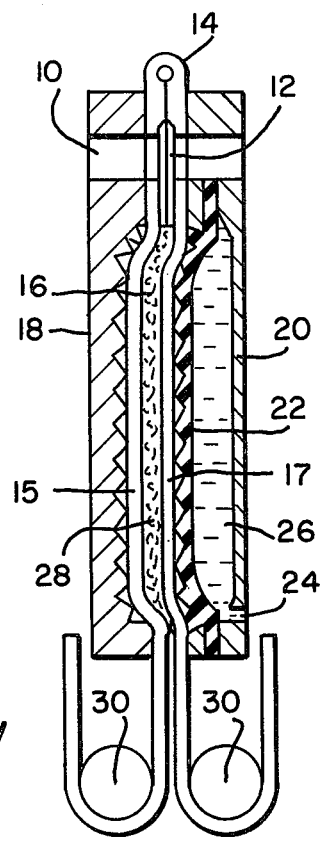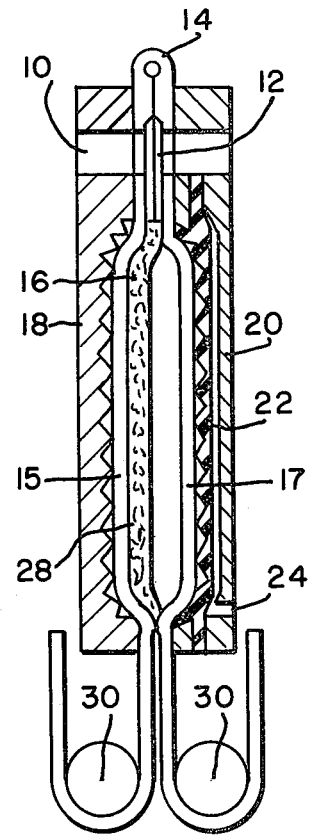
FIG. 1   FIG. 2   FIG. 3
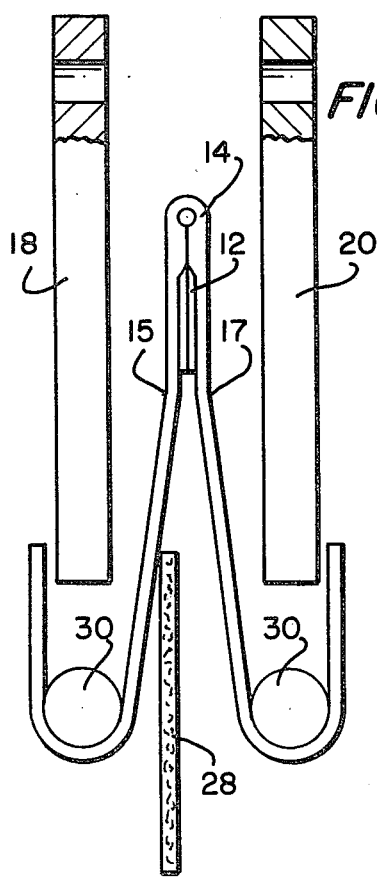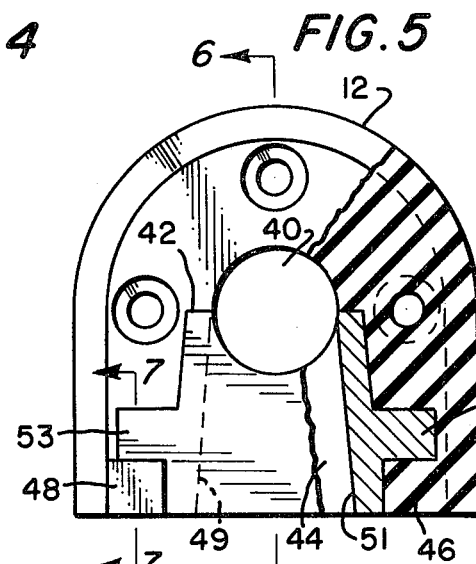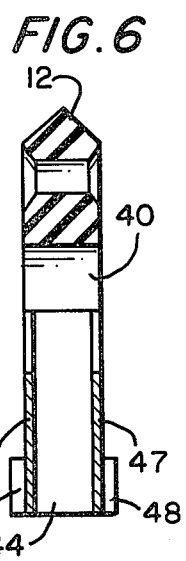
FIG. 4   FIG. 5   FIG. 6
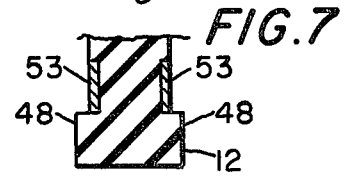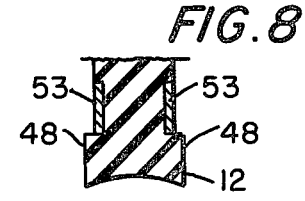
FIG. 7   FIG. 8

FEEDING DEVICE FOR USE IN FILTER PRESSES

This invention relates to apparatus for compressing a suspension of solid material in a liquid into a cake. More particularly, this invention is a new feeding device for feeding the suspension into a filtering chamber.

One example of a filter press in which this invention has particular utility is disclosed in U.S. Pat. No. 3,807,567 entitled "FILTER PRESS" granted Apr. 30, 1974, to Akitoshi Iwatani. One particular problem with filter presses of the prior art is that when certain types of materials are compressed to form a cake just below the end of the feeding device, these materials stick to the bottom of the feeding device when the compression pressure is released for removal of the cake. In some cases, almost the entire cake sticks to the bottom of the feeding device. When this happens, the efficiency of the filter press is greatly decreased and since the filter press is continuously operated, the cake sticking to the bottom of the feeding device may accumulate to the extent that the feeding device becomes clogged and the filter press must be shut down.

This invention is a new feeding device which is specifically constructed to prevent the cake from sticking to the bottom of the device. Briefly described, the feeding device has an inlet spaced from the bottom thereof. The feeding device includes elastically deformable material and conduit means extending from the suspension inlet to the base of the feeding device. The elastic material extends upwardly from the base of the feeding device. Upon compression, the elastic material is deformed. Upon release of the compression, the elastic material returns to its original shape thereby releasing potential energy to dislodge any cake tending to stick to the bottom of the feeding device.

The invention, as well as its many advantages, will be further understood by reference to the following detailed description and drawings in which:

FIG. 1 is a side elevational sectional view showing a single chamber of a filter press;

FIG. 2 is a side elevational sectional view showing the chamber of FIG. 1 during compression;

FIG. 3 is a side elevational sectional view showing the filter chamber of FIG. 1 during decompression;

FIG. 4 is a side elevational view, partly in section, showing the filter chamber of FIG. 1 as the cake is released;

FIG. 5 is a front view, partly in section, of a preferred embodiment of the feeding device;

FIG. 6 is a sectional view taken along lines 6—6 of FIG. 5;

FIG. 7 is a sectional view taken along lines 7—7 of FIG. 5;

FIG. 8 is a view similar to FIG. 7 but showing the base of the feeding device as it looks during the compression cycle;

Figure 9:
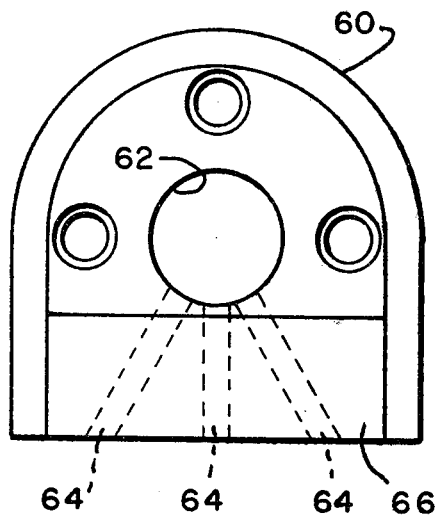
FIG. 9 is a front view of a second preferred embodiment of the feeding device.

Referring to the drawings, and more particularly to FIG. 1, a single filter chamber of a filter press is shown. This filter chamber is one of a plurality of filter chambers, which may be similar to the filter chambers of the filter press shown in U.S. Pat. No. 3,807,567. A feed slurry is passed through conduit 10 and through the feeding device 12 mounted in the upper part of a filter cloth 14. The feed slurry is fed downwardly through the feeding device 12 into the filtering chamber 16.

The filter chamber 16 is formed by filter plates 18 and 20. A diaphragm 22 is mounted in filter plate 20. This diaphragm may be pressed against the filter cloth to press out a large portion of the liquid in the feed slurry by the addition of water through conduit 24 in filter 20 and against the back side of diaphragm 22.

FIG. 2 shows the position of the parts during the compression cycle. High pressure water 26 against diaphragm 22 dewaters the feed slurry to form a cake 28. During the decompression cycle shown in FIG. 3, the pressure against the diaphragm 22 is released while preparing the cake 28 for discharge. To release the cake, as shown in FIG. 4, the filter plates 18 and 20 are opened. As the filter cloth and attached feeding device 12 move downwardly, the portions 15 and 17 of the filter cloth spread apart as they move around guide rolls 30 to release cake 28.

With conventional feeding devices, if the filter press is used to filter certain materials, often, at least a portion of the cake sticks to the feeding device. Since the filter press automatically repeats its cycles, if not all of the filter cake is released during each cycle, enough filter cake may accumulate at the bottom of the feeding device to block up and clog the feeding device, requiring the shut down of the filter press for repairs. This problem is eliminated by this invention.

As shown in FIG. 5 and FIG. 6, the new feeding device 12 has a feed inlet 40 spaced from the bottom of the device. A support 42 made of a solid non-deformable material such as metal extends from approximately the mid-point of the inlet 40 downwardly to the base of the device 12. A conduit 44 (see FIG. 6), formed by vertical walls 45 and 47, and upwardly tapering walls 49 and 51, extends from the inlet 40 to the base of the feeding device. The metal support 42 is desirable to make certain that the feeding device does not become so compressed during the compression cycle that the sides of the conduit 44 move together or so close together that the free passage of the suspension through the conduit 44 is prevented.

The remaining part of the feeding device 12 is made of an elastically-deformable material 46. This material, which may be a polymeric material, has elastic properties. Examples of materials which have good to excellent elastic properties are SBR (styrene-butadiens rubber), nitrile (butadiene-acrylonitrile co-polymer), and silicone. When pressure is applied to the material, its shape is deformed and when pressure is released, the material returns to its original shape.

The elastic material extends upwardly from the base of the feeding device 12 and is kept in place on the metal support 42 by means of spaced lugs 53 and spaced lugs 55 (only one shown). The elastic material extends through the space between lugs 53 and the space between lugs 55. That part of the elastic material below lugs 53 and below lugs 55 extend outwardly beyond walls 45 and 47 in the form of a plurality of projections 48.

In operation, during the compression cycle as shown in FIG. 2, the pressure in the filter chamber and against the base of the feeding device 12 will cause at least the elastic material below lugs 53 and below lugs 55 to deform from the shape shown in FIG. 7 to a shape somewhat as shown in FIG. 8. This deforming builds up potential energy. When the pressure is released, the elastic material will snap back from its deformed shape of FIG. 8 to its normal shape shown in FIG. 7. This snapping back releases the potential energy and dislodges any cake tending to stick to the bottom of the feeding device.

Figure 10:
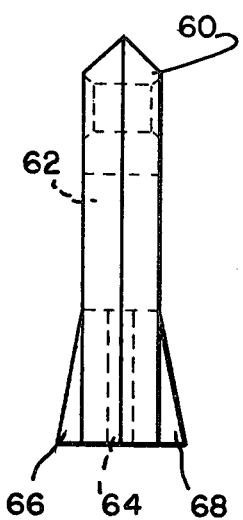
FIG. 10 is a side view of the embodiment of FIG. 9.
Figure 11:
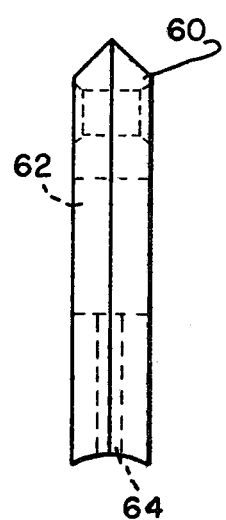
FIG. 11 is a view similar to FIG. 10 but showing the feeding device of FIG. 9 as it looks during the compression cycle.

For some uses the compression force may be low enough to permit the use of a feeding device consisting entirely of elastic material. Such a feeding device is shown in FIG. 9 through FIG. 11. Referring to these Figures, the feeding device 60 is made entirely of elastic material. It includes an inlet 62 spaced from the bottom of the feeding device and a plurality of conduits 64 (shown in broken lines) extending from the inlet to the base of the feeding device.

Elastically deformable material portions 66 and 68 are located on the front and back, respectively, of feeding device 60. Elastic material portions 66 and 68 extend from the base of the feeding device to just below inlet 62 and taper upwardly so that the greatest width of the feeding device is at its base.

The operation of the second embodiment of FIG. 9 through FIG. 11 is like the operation of the first embodiment of FIG. 1 through FIG. 8. During the compression cycle the elastic material below inlet 62 will deform to a shape somewhat as shown in FIG. 11. When the pressure is released, the elastic material will snap back to its normal shape shown in FIG. 10 to dislodge any cake tending to stick to the bottom of the feeding device.

I claim:

1. In a filter press for filtering liquids, the press comprising filter means consisting of separable filter plates forming filter chambers, filter media, and diaphragms for removing liquid to form filter cakes and displacing the filter cakes from the chambers when the filter plates are displaced to an open position, the improvement comprising: inlet means conducting liquid to the upper portion of said filter chamber being constructed and arranged with an elastically-deformable material that is compressed under fluid pressure as cake builds in the chamber, whereby as the filter plates are opened the elastic material comprising the inlet returns to its original shape dislodging material tending to adhere to the inlet conduit, otherwise causing it to clog, making the filter press inoperative.

2. A filter press in accordance with claim 1 wherein the inlet means consists entirely of elastically-deformable material and has portions tapering upwardly from the base of the inlet means.

3. A filter press in accordance with claim 1 wherein the inlet means comprises a metal support and the elastically-deformable material is mounted on the metal support.

4. A filter press in accordance with claim 3 wherein the elastically-deformable material on the inlet means has a plurality of projections extending outwardly from each side of the base of the inlet means.

5. A filter press in accordance with claim 4 wherein the elastically-deformable material of the inlet means is kept in place on the metal support by a pair of separated lugs extending from each end of the metal support, and the elastically-deformable material extends through the spaces between each of said pairs of separated lugs.

* * * * *